July 12, 1938. H. WAAG Re. 20,798

ART AND MACHINE FOR CUTTING PATTERNS INTO FUR SKINS

Original Filed Oct. 5, 1927

HERMAN WAAG INVENTOR.

BY Alexander Meucher

ATTORNEY.

Reissued July 12, 1938

Re. 20,798

UNITED STATES PATENT OFFICE 20,798

ART AND MACHINE FOR CUTTING PATTERNS INTO FUR SKINS

Herman Waag, Neuilly-sur-Seine, Paris, France, assignor to Crown Fur Dyeing Corporation, New York, N. Y., a corporation of New York Original No. 1,747,406, dated February 18, 1930, Serial No. 224,187, October 5, 1927. Application for reissue October 26, 1936, Serial No. 107,642. In Germany August 31, 1927

9 Claims. (Cl. 149—26)

Producing patterns in fur-skins has hitherto been done by dyeing. The known processes, as in the cases of plush, of cutting the hair according to a template, and producing patterns without any differences in color, cannot forthwith be applied to fur-skins. During cutting of fur-skins special conditions arise because of the considerable length of the hair, the soft falling-over of the hair, and the natural falling direction of the hair. These conditions distinguish fur skins from other material from the standpoint of cutting out patterns.

Only such productions of patterns have consequently hitherto been known wherein the pattern appeared in quite a simple form, as for instance, stripes running out in the direction of the fall of the hair.

The present invention has as its object the cutting out of any desired kind of pattern in fur skins, the pattern being all around bordered and being, if desirable, crosswise to the falling direction of the hair. Thus are obtained fashion effects considerably surpassing the hitherto known ones in beauty and rich variety. As the manufacture of furs represents a trade with a great demand for changes in fashion, a correspondingly great industrial advance is due to such process.

The process consists mainly of a template of sufficiently stiff material simultaneously passed with the fur skin to be cut in front of a cutting device in suitable manner. The cutting device operates in conjunction with novelly conceived means of straightening and drawing the hairs through the apertures of the template. The device according to the present invention consists on the one hand of the mentioned template containing the parts of the surface intended to be cut out of the fur skin in shape of recessed holes, and on the other hand of novel arrangements for practical operation of the said template in conjunction with the straightening and drawing means for the hairs.

One embodiment of the invention is described below wherein one of the customary fur-cutting machines is used. It is however easily seen that the invention may be applied to other desirable types of fur-cutting machines.

Figure 1:
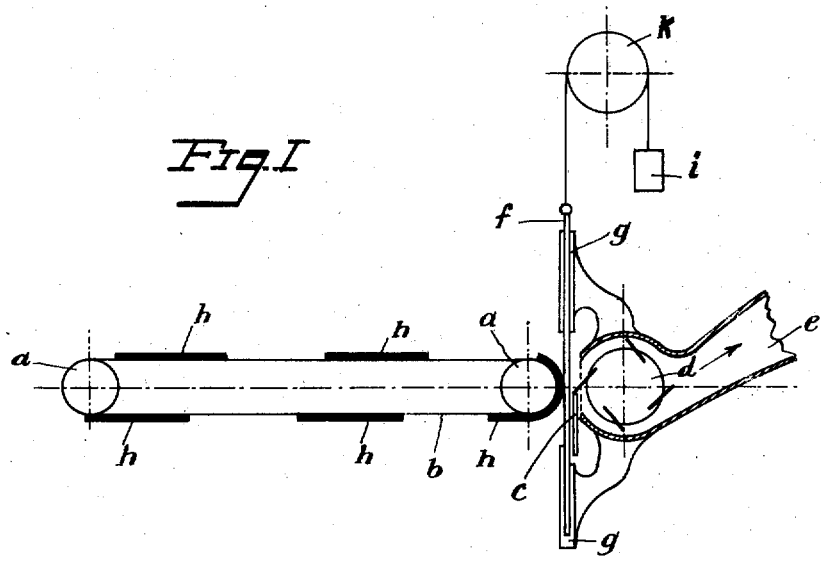
Figure 2:
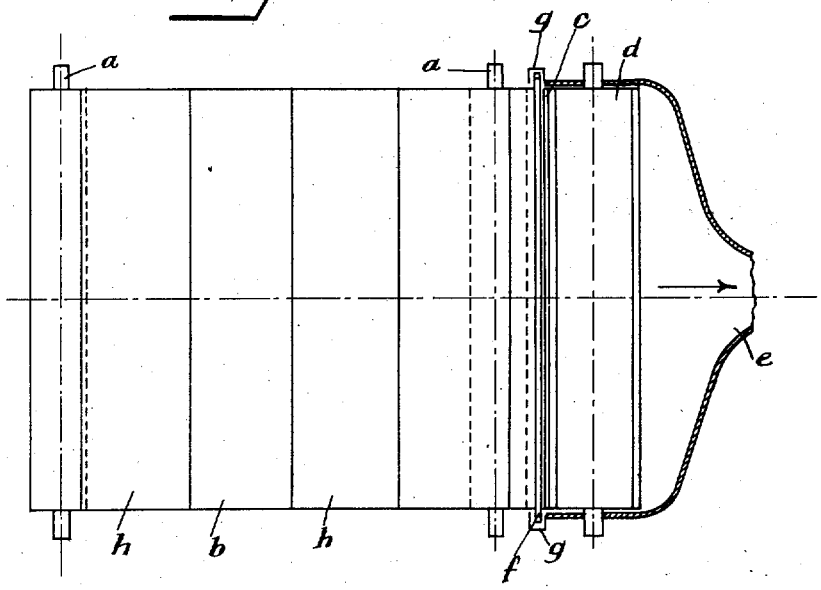

In the drawing accompanying this specification and showing preferred embodiments of the invention, Figure 1 is a longitudinal section through the parts of a fur-cutting machine involved in the invention showing other cooperating and novel parts. Figure 2 is a view of the structure set forth in Figure 1 in plan, the casing of the fur-cutting machine being shown in cross-section.

In accordance with the drawing *a*, *a* are transport rollers, being driven in the usual manner either by hand or motive power and moving the conveying belt *b* along to and in front of the cutter.

*c* is a stationary knife cooperating with a revolving circular cutter *d*. A suction-pipe line *e* to the air-propeller removes the air in the direction of the arrow thereby raising the hair of the fur to be cut out in front of the cutter and drawing the same in as far as the hair is not covered by a template *f*. The template *f* as shown is in the shape of a rectangular plate. The material of the template is flexible and yet stiff enough to prevent possible corners from projecting into the pattern apertures, and being bent in the direction of the cutter where the said corners could be caught by the same. Metal or iron as well as cardboard, celluloid or the like is suitable for this purpose. The bending of such projections of the template *f* in the direction of the cutter is thereby made well-nigh impossible, being furthermore insured against this contingency by suitable guiding means for the template. Thus, the template is made to rest firmly upon the surface of the fur-skin in its passage, thereby covering the fur skin with the desired pattern. As an example, the template *f* is guided by lateral guide-rails *g*, *g* so that the template passes close in front of the fur skin, the template being between the latter and the cutter as the fur skin itself is passed around the guide roller *a*. Moving the template *f* can be effected by friction with the fur skin; by suitable cooperation with lateral portions of the guide roller and/or the conveying belt; by gear transmission or other known means, the movement being effected with exactly the same speed with which the fur skin moves or at other desired relative rates.

The templates are generally made so large, that their length suffices for the passage of a fur-skin *h*. Before the next fur skin *h* is fed forward, the template *f* is returned to its upper starting-position by either withdrawing the same entirely from the guide and inserting it again from above, or drawing the same back into the guide by reversing its former moving-direction. In order to prevent the template from dropping too quickly consequent to its weight, a compensating-weight *i* is fastened to it and suspended over a roller *k*. If the weight is made sufficiently large, an upward pulling force is produced, whereby the template is automatically moved back as soon as the motive force ceases whereby it has been moved down during the cutting process. Instead of a pull by weight, a tension-spring or any other suitable device may be used.

The manner of transport of the fur skins toward the cutting tool can be effected in many ways. The skin or skins may lie permanently upon the side of the template away from the cutter, or may be in contact with the template only at the moment when the template passes the cutter, as shown in Figure 1.

I wish it understood that minor changes and variations in the selection of the known cooperating members of the invention together with their integration and location may all be resorted to without departing from the spirit of the invention and without departing from the scope of the claims.

I claim:

1. In a device for cutting out patterns in fur skins, the combination of a cutting tool, an apertured and resilient flat template, means to move the said template in front of the said cutting tool in a plane, means to feed and secure the skin against the template for simultaneous movement with the template while the latter passes in front of the cutting tool thereby allowing the free hairs to penetrate through the apertures toward the said cutting tool, and means to raise and draw the free hairs extending through the apertures of the template toward the cutting tool during cutting operation.

2. In a device for cutting out patterns in fur skins as described, the combination of a flat apertured template of stiff material, the apertures of which represent all around bordered designs, a cutting tool, means to move the said template whereby the template is, during cutting operation, moved in approximately a straight line along and in front of the said cutting tool, and means to raise and draw the free hairs extending through the apertures of the template toward the cutting tool during cutting operation.

3. A construction as defined in claim 1 wherein the last mentioned means comprises a suction chamber formed with the cutting tool.

4. A construction as defined in claim 1 wherein the last mentioned means comprises a vacuum chamber communicating with and rearwardly of the cutting tool.

5. In a process for cutting out patterns in fur skins, the steps of depressing hairs on selected portions of the skin against an apertured template moving in a plane, raising and straightening out the undepressed hairs, and cutting off the said hairs so straightened out.

6. In a process for cutting out patterns in fur skins, the steps of depressing hairs on selected portions of the skin by means of a flat and apertured template moving along a plane, raising and straightening out the undepressed hairs through the said apertures, and cutting off the hairs so straightened.

7. In a process for cutting out patterns in fur skins, the step of raising and drawing in selected portions of hairs through the apertures of a flat template moving in a plane across a cutting tool.

8. In a device as described for cutting out patterns in fur skins, the combination of an apertured and resilient flat template moving in a plane and means to raise and draw the free hairs of the fur skins extending through the apertures of the said template.

9. In a device as described for cutting out all around bordered patterns in fur skins, the combination of an apertured and resilient flat template moving in a plane, a cutting tool and means to raise and draw the free hairs of the fur skins extending through the apertures of the said template toward the said cutting tool.

HERMAN WAAG.